Patented Sept. 11, 1928.

1,683,605

UNITED STATES PATENT OFFICE.

ALBERT L. CLAPP, OF DANVERS, MASSACHUSETTS, ASSIGNOR TO BECKWITH MANUFACTURING COMPANY, OF BOSTON, MASSACHUSETTS, A CORPORATION OF MASSACHUSETTS.

BUTTON BOARD AND PROCESS OF MANUFACTURE.

No Drawing.   Application filed February 15, 1921. Serial No. 445,185.

This invention has for its object to provide a compact, dense and moldable material, adapted to be made plastic by heat and pressure, and capable of use in the manufacture of buttons, talking-machine records and other articles useful in the arts, and to provide a process by which such material may be made in sheet form by the employment of any suitable paper-making machine.

According to my invention, the material is initially produced in sheet form of the desired thickness by building it on the makeup roll of a wet machine, such as ordinarily employed in the manufacture of box board. To this end, any suitable paper-making materials may be used, such as ground or chemical wood pulp, waste paper, or the like, and a relatively coarse water-insoluble resinous gum of the nature of rosin, shellac, copal, sandarac, etc., which is solid at 77° C. and which will melt under heat and pressure. The gum should be in relatively large particles,—such as will pass through a 20 to 40 mesh sieve, and should be thoroughly mixed with the paper stock, before the latter is formed into a web or thin layer and wound in successive convolutions about the makeup roll. After the sheet has been produced in tubular form with the thickness desired, it is slit and removed from the makeup roll, and then, after it has been dried, in flat form it is subjected to heat and high pressure, for the purpose of melting the large particles of gum and forming a hard, compact, dense, homogeneous, non-flexible sheet.

For example, into a beating engine, I place 60 parts by weight of cellulosic material (e. g. waste paper, or ground or chemical wood pulp), 25 to 60 parts by weight of rosin or its equivalent such as described, and sufficient water to permit a free circulation of the stock. These materials are then beaten and disintegrated until they are well mixed and the pulpy mass is ready to be formed into a sheet on a wet machine. After the sheet has been formed and removed from the makeup roll, it is now dried flat, and is then subjected to a pressure of about 2000 pounds to the square inch and a temperature of about 200° to 250° F., thereby causing the rosin to melt and to flow uniformly throughout the stock. The sheet, in this condition, is stiff, dense, compact and substantially waterproof, and may be again molded by the application of heat and pressure into different forms. If desired, buttons or talking-machine records, or other articles may be made therefrom by a molding process. In the manufacture of buttons or other products, the dried, relatively porous sheet may be cut into blanks of the desired size and shape, and molded under the heat and pressure described to produce them directly, thereby omitting one of the molding operations.

In the production of the coarse particles of gum, it frequently happens that, in the grinding or crushing operation to which the gum is subjected, more or less powder or fine particles are inevitably produced, which, in forming the web, escape to a considerable extent with the water from the stock. To prevent this loss, I preferably employ a semi-insoluble agglutinant which retains in the stock the powdery particles of the gum. For example, I employ a converted starch or its equivalent, such as potato, corn or flour starch treated with lime, as in the form of calcium carbonate or calcium hydroxide. In such case, to the furnish hereinbefore described, comprising 60 parts paper stock and 25 to 60 parts rosin, I add 5 parts by weight of starch and 5 parts by weight of lime. The last two materials may be placed in the beater when the paper stock and the rosin are dumped therein, and before the beating operation is started. The starch is converted by the lime into a semi-soluble state, and acts as a size to adhere to the finely divided gum and to retain it in suspension in the stock.

The initial product, as produced by the wet machine and after being dried, is fairly open and porous, is not uniform because of the presence of large particles of gum distributed more or less unevenly through it, and will readily break when bent; but, after being subjected to heat and pressure as herein described, the material is converted to a condition in which it is waterproof, hard, dense, compact, stiff, rigid, and moldable when again subjected to heat and pressure. Notwithstanding that the sheet initially consists of a plurality of layers of laminations, yet, when it is molded as herein described, the molten gum flows or tends to flow from one lamination or layer into the adjacent layers, and causes the layers to be interlocked together. Hence there is an even or equal distribution throughout the sheet of the gum and the cellulosic material.

What I claim is:—

1. The herein described process which comprises disintegrating and beating in water a cellulosic material, a mechanically comminuted resinous gum, and a suspension medium, and forming into shape the pulp so produced.

2. The herein described process which comprises disintegrating and beating in water a cellulosic material, a mechanically comminuted resinous gum, and a semi-insoluble agglutinant, and forming into shape the pulp so produced.

3. The herein described process which comprises disintegrating and beating in water a cellulosic material, a mechanically comminuted resinous gum, and a semi-insoluble agglutinant and densifying the pulp by heat and pressure.

4. The herein described process which comprises disintegrating and beating in water a cellulosic material, a mechanically comminuted resinous gum, and a semi-insoluble agglutinant, and forming the pulp into sheets, drying the sheets, and subjecting the sheets or portions thereof to great pressure at a temperature sufficient to melt the gum.

5. The herein described process which comprises disintegrating and beating in water a cellulosic material, coarsely-divided solid resinous gum and a semi-soluble lime-converted starch, flowing the pulp thus produced into a sheet on a paper machine, and drying the sheet.

6. The herein described process which comprises disintegrating and beating in water a cellulosic material, coarsely-divided solid resinous gum and a semi-soluble lime-converted starch, flowing the pulp thus produced into a sheet on a paper machine, drying the sheet, and subjecting the sheet or portions thereof to heat and to great pressure.

7. A composition of matter comprising cellulosic material, resinous gum, and a semi-insoluble agglutinant compacted and densified under heat and pressure.

8. A composition of matter comprising a plurality of layers of cellulosic material, resinous gum and a semi-insoluble agglutinant evenly distributed throughout the mass and compacted and densified under heat and pressure.

In testimony whereof I have affixed my signature.

ALBERT L. CLAPP.